R. H. LONG.
PROPELLING PASSENGER CARS BY STEAM.
No. 26,911. Patented Jan. 24, 1860.
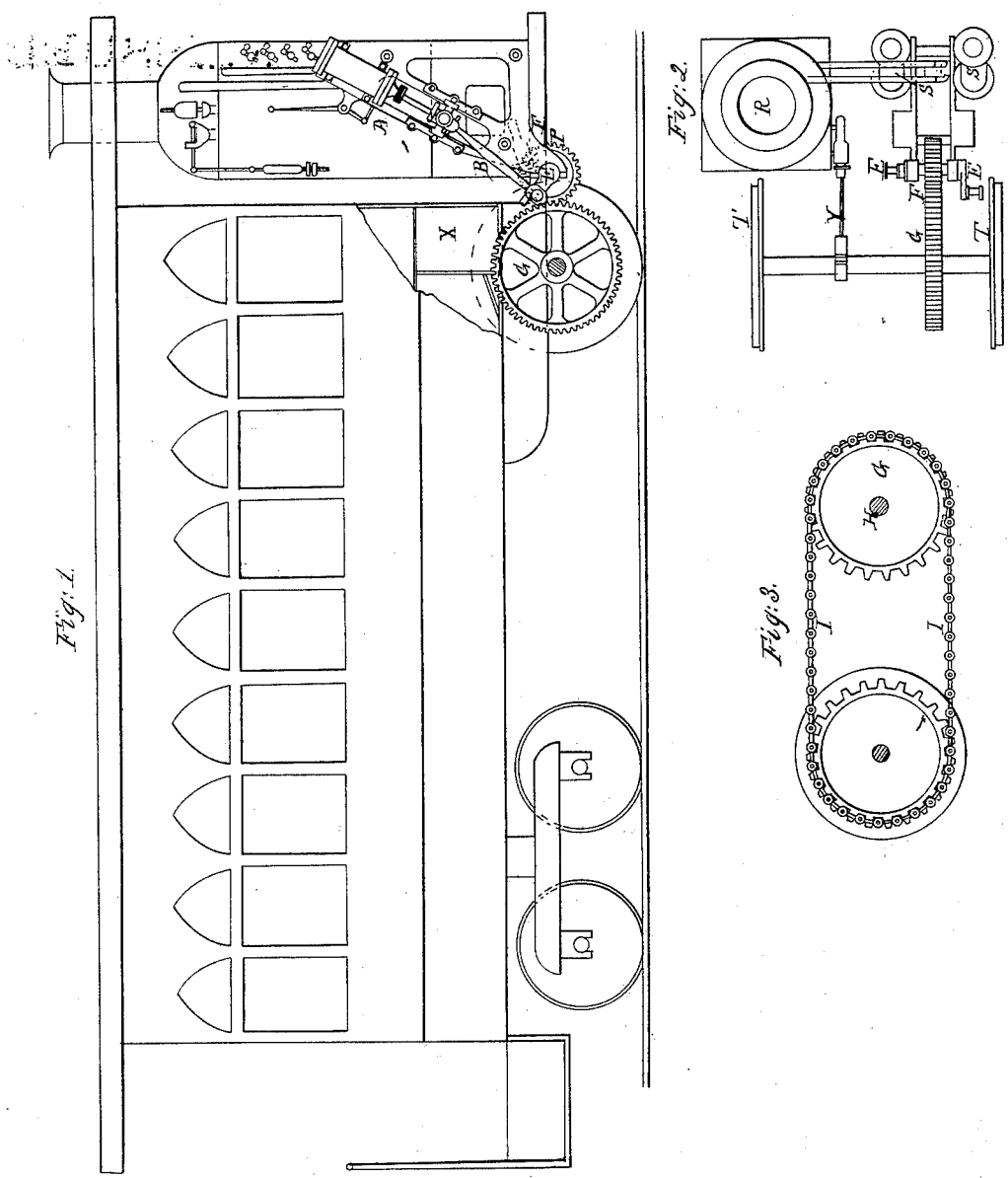
Witnesses.
Inventor.

UNITED STATES PATENT OFFICE.

ROBERT H. LONG, OF PHILADELPHIA, PENNSYLVANIA.

ARRANGEMENT OF STEAM-ENGINES FOR PROPELLING STREET PASSENGER-CARS.

Specification forming part of Letters Patent No. 26,911, dated January 24, 1860; Reissued January 15, 1861, No. 1,125.

*To all whom it may concern:*

Be it known that I, ROBERT H. LONG, of the city and county of Philadelphia and State of Pennsylvania, have made a new and useful Improvement in the Mode of Propelling Passenger Railway-Cars by Steam, and do hereby declare the following to be a full, clear, and exact description of the same, reference being had to the annexed drawing, making a part of this specification, in which—

Figure 1 is a side view of a passenger car containing my improvement. Fig. 2 is a plan of the same. Fig. 3 shows a mode of connecting the engine with the axle.

My invention consists first in placing small engines and boiler upon the front platform of a passenger railway car as shown at A; secondly, in so constructing the engine as to bring the shaft on a parallel and horizontal line with the car axle.

My invention is peculiarly adapted to railroads in cities, and wherever a locomotive, from its size, would be objectionable. Hitherto engines have been placed on the top of, under the bottom of, and in the car, but all these plans are more or less objectionable. I arrange the boiler and engine upon one platform, (the forward one preferred,) and connect the engine, either by the way hereafter described, or in any other convenient way, directly with the wheels of the car.

Fig. 2 shows one method of arrangement. M is the boiler, S S are the engines, P and G the pinion and cogwheel, T, T, the car-wheels, and Y is the pump for supplying the boiler. By this means the room for passengers is not decreased, while ample room is afforded for the engineer upon the platform; and at the same time all parts of the engine are under his immediate view and control.

The water tank X is placed in the front of the car, and so arranged as to form an additional seat, or it might be placed under the seats as now arranged.

The frame of the engine is brought almost immediately in contact with the driving wheels, and the pinion F is placed upon the frame itself. The advantage of this arrangement is that the engine is made stronger and more compact. The jolting of the car upon its springs renders great strength absolutely indispensable.

The connecting rod B is attached by means of the crank E to a pinion F. The pinion F is geared into a cog wheel G. This cog wheel may be upon the forward axle of the car as shown in Fig. 1—and thus transmit the motion directly to the car wheel, or it may be on a separate shaft H as shown in Fig. 8 and the motion transmitted to the forward wheels of the car by means of an endless chain I I passing over another cog wheel on the forward axle.

I have above described one of the engines and the mode of attaching it to the car. A similar engine may be placed upon the other side of the car and attached in a similar manner.

The cog wheel G is of a larger size and furnished with a greater number of teeth than the pinion F by which means the power is increased. The advantage of this mode of connection is that small engines running at a great velocity may be used, and an amount of power attained equal to that produced by a larger and heavier engine connected in the ordinary manner.

Having thus described my improvement, what I claim as my invention, and desire to secure by Letters Patent, is—

1. Placing a steam engine and boiler constructed and arranged as described on the platform of a city passenger railway car in a manner substantially as specified.

2. Placing the pinion F upon the frame of the engine, thus permitting the engine to be brought close to its work and the whole to be used in combination with a city passenger railway car, for the purposes set forth.

ROBT. H. LONG.

Witnesses:
　J. G. NUNICHILD,
　JOSEPH GRICE.